United States Patent
Hiles

[19]

[11] Patent Number: 6,026,491

[45] Date of Patent: Feb. 15, 2000

[54] CHALLENGE/RESPONSE SECURITY ARCHITECTURE WITH FUZZY RECOGNITION OF LONG PASSWORDS

[75] Inventor: Paul Hiles, Tomball, Tex.

[73] Assignee: Compaq Computer Corporation, Houston, Tex.

[21] Appl. No.: 08/940,893

[22] Filed: Sep. 30, 1997

[51] Int. Cl.[7] ........................................ H04L 9/32
[52] U.S. Cl. .............................................. 713/202
[58] Field of Search ................................. 713/200, 201, 713/202; 380/23, 25

[56] References Cited

U.S. PATENT DOCUMENTS

| | | | |
|---|---|---|---|
| 5,425,102 | 6/1995 | Moy | 380/25 |
| 5,430,827 | 7/1995 | Rissanen | 704/246 |
| 5,432,851 | 7/1995 | Scheidt et al. | 380/25 |
| 5,892,902 | 4/1999 | Clark | 713/201 |

Primary Examiner—Robert W. Beausoliel, Jr.
Assistant Examiner—Christopher A. Revak
Attorney, Agent, or Firm—Robert Groover

[57] ABSTRACT

A password-phrasing security mechanism utilizing personalized challenge phrasing to prompt the user into remembering a pre-defined personalized coded phrase to gain access to a secured system.

48 Claims, 1 Drawing Sheet

CHALLENGE/RESPONSE SECURITY ARCHITECTURE WITH FUZZY RECOGNITION OF LONG PASSWORDS

BACKGROUND AND SUMMARY OF THE INVENTION

This application relates to computer systems and the security features incorporated into such architectures.

BACKGROUND: SINGLE-WORD PASSWORDING

To protect computers and the data stored in them, various forms of password protection are commonly used. However, a primary concern is balancing the high security requirements of a password-protected system against the user's ability to remember that password. Current password systems allow the user to define a case-sensitive alphanumeric text string that must be entered precisely as defined each time the user wants to gain access to the system. If the user makes a mistake in entering the password, access is denied and the system usually prompts the user to re-enter the password. On more sophisticated systems, the administrator or security specialist can program the security system to deny access after a fixed number of failed login attempts.

Current problems with the existing single-word password approach are numerous. A user who forgets the password will be locked out of the computer or passworded system. The administrator or support personnel must then be called in to resolve the problem, which results in increased costs for resources, down-time, and lost access to the system.

If a user is required to remember a cryptic alphanumeric string (as ideal password security procedures promote), it becomes more difficult to remember, and the user is more inclined to record the password in a "secret" place for quick reference. This is unacceptable and reduces the level of security of the system as the "secret" places are usually limited in number, and an experienced thief or hacker is usually well-versed on where to look for recorded passwords. Therefore, the user tends to pick common words as passwords. This too is discouraged but not foolproof as the administrator is limited in what passwords can be prohibited for use.

Another less desirable feature of the current password-protection methods is if the user is given the option to create his or her own password, the tendency is to pick, for example, a name, address, or word which in some way is closely associated with that person. Additionally, the personally-derived password is usually quite short and therefore becomes more of a security risk with regard to someone being able to hack it. Unfortunately, easy to remember usually means easy to guess/crack.

Current methods prompt the user for a password without any "helper" phrases. The user has to remember the password without any textual prompting from the passworded system that may aid the user in recalling the password. If the user has not used the computer or passworded system for a period of time, it is very likely that they will forget the password if it is of any complexity.

Challenge/Response Security Architecture with Fuzzy Recognition of Long Passwords This application discloses a computer security system which provides a combination of features which synergistically combine to facilitate the use of very long password phrases (over 20 characters or even over 40). The innovative method enables a user to define a personalized challenge phrase, hereafter called the challenge, and a personalized response phrase, hereafter called the response, to that challenge phrase.

In practice, the system challenges the user who then (if he or she can't remember the exact response phrase) may enter a response which closely matches, but is not identical to, the pre-defined response phrase. Fuzzy logic technology permits the use of imprecise and vague information, knowledge, and concepts. As applied to this innovation, if the user response is sufficiently close to the pre-defined response, the user is granted access to the secure system.

For example, it is incumbent upon the user to not make the pre-defined phrase exactly as most users would know it. The user should not develop a pre-defined phrase such as "the rain in spain falls mainly in the plain", but should make the phrase more difficult to discover or determine by brute force by using misspelled words or extra spaces between words, e.g. "the (2 spaces here) rane n spane fawls (2 spaces here) manly n de plane." This technique makes the response phrase much more difficult to discover while maintaining a high level of security. The level of security can be manipulated by restricting the number of "hits" required for a "substantial match" between the pre-defined response phrase and the user input response phrase. The prior example response phrase includes a total of 41 characters, including the spaces. The security administrator could require, for example, 39 of 41 character hits for a substantial match. Alternatively, the administrator could require whole word hits for key words in the phrase and relax the matching requirements for articles such as a, and, or the. The user could also include a combination of alphanumerics and special characters as allowed by the particular system. The format for restricting the make-up of the pre-defined response phrase becomes very flexible for the security administrator or designer to implement.

The challenge phrase should be selected by the user to serve as a reminder of the appropriate response. Therefore, for the above response, a corresponding challenge might be "Hello, Eliza!". A less appropriate challenge might be "Where is the rain in Spain?", which would provide too much of a common reference to the response phrase.

An advantage of this innovative concept is that the user is challenged with a phrase each time an attempt is made to gain access to the computer system. This challenge/response method is more helpful to a user for retaining a unique security access code than are conventional single-word, alphanumeric, and sometimes cryptic password systems.

Another advantage of this innovative concept is that it allows the user to enter a much longer and more complex "password" (the response in this disclosure) with much less probability that the user will forget the password. For example, people can recall an amazing amount of information if first challenged with a question. The question gives us a narrow context in which to recall the correct answer. The fact that both the challenge and the response are configured to personal values by the user, also helps with the memory recall process.

Another advantage of this innovative concept is that the system does not require an exact match between the pre-defined response and the user input response. When the user enters a response, a comparison is performed wherein fuzzy logic technology allows a successful match for a range of substantially similar responses that closely match the pre-defined response string.

Another advantage of the phrase-secured system is that long strings of characters comprised of distinct words can be reintroduced back into standard passworded security systems enhancing the protection of the system. Whereas the present single, alphanumeric, password scheme is limited in size based upon the user's ability to remember it, for example 5–10 characters, the innovative system may include many more characters, for example, 20 or more, increasing the difficulty for someone trying to break in the system.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
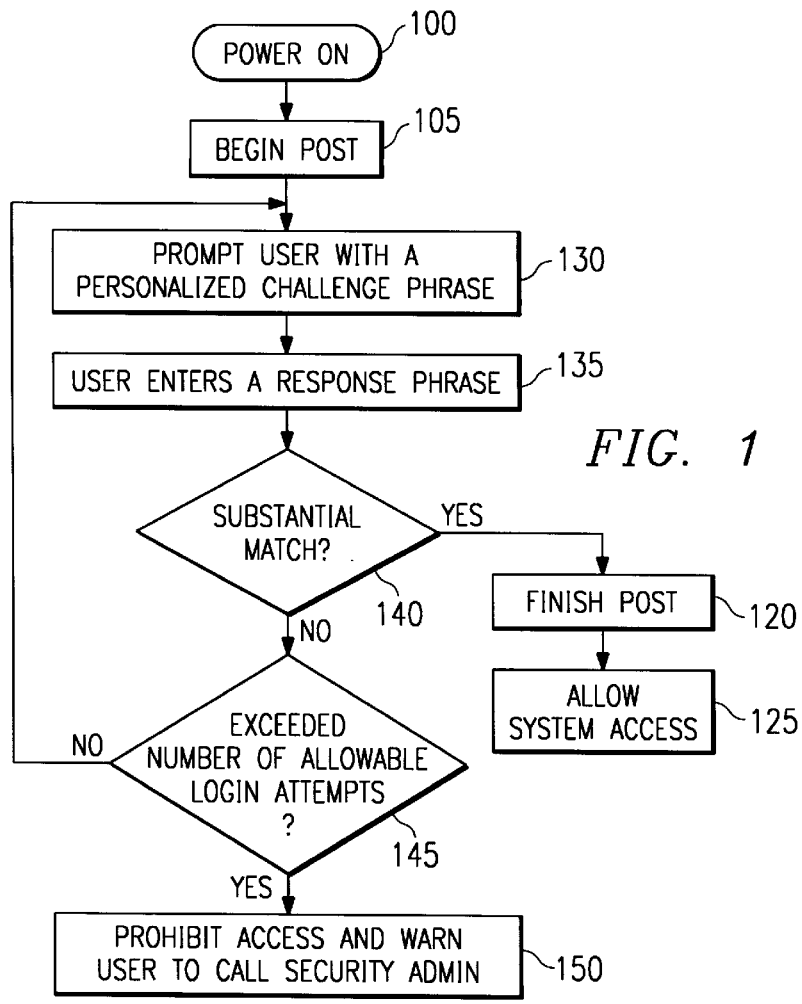
FIG. 1 shows a flowchart of the process of the presently preferred embodiment.

FIG. 1 shows a flowchart of the process of the presently preferred embodiment. In a system utilizing the password scheme during the Power-On Self-Test ("POST") procedure, the user first powers-on the equipment (step 100). The POST procedure automatically begins execution (step 105) during which the security program prompts the user with a personalized challenge phrase (step 130). The user then enters a response phrase (step 135). A test for a substantial match between the pre-defined response and user input response is performed (step 140). If successful, the POST finishes (step 120) and the user is allowed access to the system (step 125). If the match fails and the user has not exceeded the number of failed login attempts (step 145), then the application re-prompts the user to enter a valid response to the challenge phrase (step 130). If the maximum number of login attempts has been exceeded, user access is prohibited (step 150). The only way the user can obtain access after exceeding the allowable number of login attempts is to contact the individual in charge of the system to resolve the problem.

Figure 2:
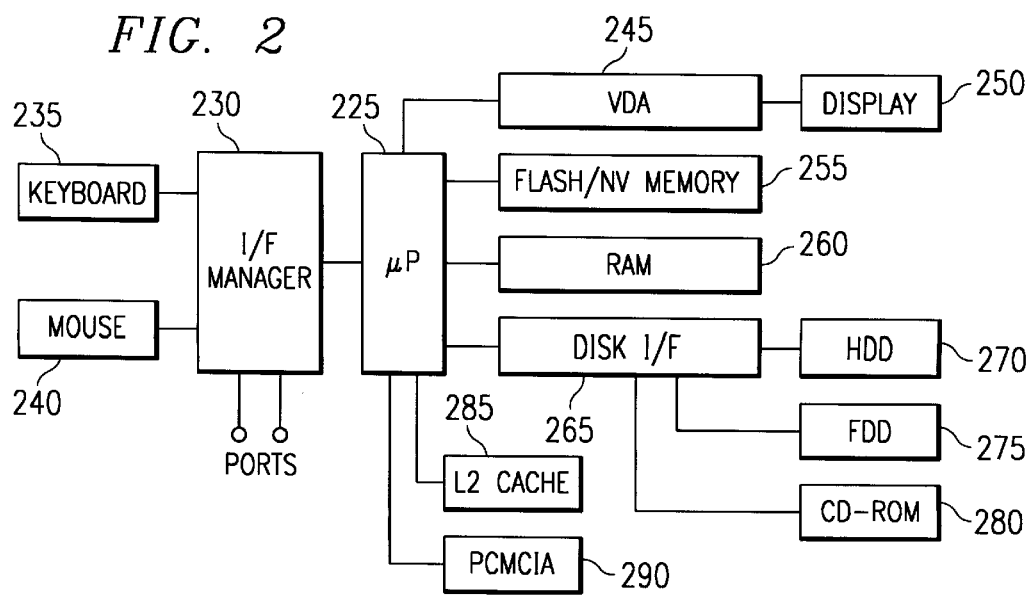
FIG. 2 shows a block diagram of a computer system according to the presently preferred embodiment.

FIG. 2 shows a block diagram of a computer (optionally, portable) using the preferred embodiment. The system comprises:

- user input devices (e.g. keyboard 235 and mouse 240);
- at least one microprocessor 225 which is operatively connected to receive inputs from said input device, through an interface manager chip 230 (which also provides an interface to the various ports);
- a memory (e.g. flash or non-volatile memory 255 and RAM 260), which is accessible by the microprocessor;
- a data output device (e.g. display 250 and video display adapter card 245) which is connected to output data generated by microprocessor; and
- (optionally) a magnetic disk drive 270 which is read-write accessible, through an interface unit 265, by the microprocessor.

Optionally, of course, many other components can be included, and this configuration is not definitive by any means. For example, the computer may also include a CD-ROM drive 280 and floppy disk drive ("FDD") 270 which may interface to the disk interface controller 365. Additionally, L2 cache 285 may be added to speed data access from the disk drives to the microprocessor, and a PCMCIA 290 slot accommodates peripheral enhancements.

Alternative Embodiment: Multiple Sequential Challenge Phrases

According to a disclosed class of innovative embodiments the challenge program may include several different challenge phrases, and each successful response is met by a new challenge phrase. In this embodiment access is allowed only if the user provides an acceptable (but not necessarily perfect) response to each of the challenge phrases. Optionally the challenge phrases may be taken from a pool of challenge phrases for that user, and may be presented in random order. This embodiment provides higher security.

Alternative Embodiment: Multiple Alternative Challenge Phrases

According to a disclosed class of innovative embodiments the challenge program may include several different challenge phrases each of which are slightly different and each of which are intended to jog the user's memory for an acceptable response. In this embodiment access is allowed if the user provides an acceptable response to any one of the challenge phrases. This embodiment provides a reduced risk of erroneous exclusion of a user.

According to a disclosed class of innovative embodiments, there is provided: A security method for controlling user access to a complex electronic system, comprising the actions of: when a user requests access, prompting the user with a customized challenge string which is specific to that user, and waiting for the user to input a user password; checking said user password for similarity to a pre-defined response string which includes more than 20 alphanumeric characters; and allowing access to said system if said user password is substantially similar to said pre-defined password, even if said user password is not identical to said pre-defined password.

According to another disclosed class of innovative embodiments, there is provided: A security method for controlling user access to a computer system, comprising the actions of: when said system is powered up, automatically executing a start-up procedure stored in a non-volatile memory; during execution of said start-up procedure, prompting a user with a customized challenge phrase which is specific to that user, and waiting for the user to input a user password; checking said user password for similarity to a pre-defined password which includes more than 20 alphanumeric characters; and allowing access to said system if said user password is substantially similar to said pre-defined password, even if said user password is not identical to said pre-defined password.

According to another disclosed class of innovative embodiments, there is provided: A method for starting up a computer system, comprising the actions of: when said system is powered up, automatically executing a start-up procedure stored in a non-volatile memory; during execution of said start-up procedure, waiting for a user identification, and accordingly displaying a customized challenge phrase, which is specific to that user, on a video display with and waiting for the user to input a user password; checking said user password for similarity to a pre-defined password which includes more than 30 alphanumeric characters; continuing the start-up procedure if said user password is substantially similar to said pre-defined password, even if said user password is not identical to said pre-defined password; and otherwise halting the start-up procedure.

According to another disclosed class of innovative embodiments, there is provided: A computer system, comprising: memory, and a microprocessor operatively connected to read and write said memory; one or more non-volatile memories storing a start-up procedure, at least one stored user-specific challenge string, and at least one stored user-specific response string which includes more than 20 alphanumeric characters; wherein, when a user attempts to log in, said start-up procedure presents said challenge string, and checks a user response string against said stored response string, and permits access to the computer if the user response substantially matches said stored response string, even if the user response is not identical to said stored response string; and a graphics controller connected to said microprocessor; and a video display connected to said graphics controller.

According to another disclosed class of innovative embodiments, there is provided: A computer system, comprising: memory, and a microprocessor operatively connected to read and write said memory; a graphics controller connected to said microprocessor; a video display connected to said graphics controller; a user input device connected to said microprocessor; wherein, when a user requests access, said microprocessor prompts the user with a customized challenge string which is specific to that user, waits for the user to input a user password, checks said user password for similarity to a pre-defined response string which includes more than 20 alphanumeric characters, and allows access to said system if said user password is substantially similar to said pre-defined password, even if said user password is not identical to said pre-defined password.

According to another disclosed class of innovative embodiments, there is provided: A computer system, comprising: memory, and a microprocessor operatively connected to read and write said memory; a graphics controller connected to said microprocessor; a video display connected to said graphics controller; one or more non-volatile memories storing a start-up procedure, at least one stored user-specific challenge string, and at least one stored user-specific response string which includes more than 20 alphanumeric characters; wherein, when a user submits identification, said microprocessor displays a customized challenge string, which is specific to that user, on said video display, waits for the user to input a user password, checks said user password for similarity to a pre-defined response string which includes more than 20 alphanumeric characters, and continues said start-up procedure if said user password is substantially similar to said pre-defined password, even if said user password is not identical to said pre-defined password, and otherwise halts the start-up procedure.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

It should also be noted that the disclosed innovative ideas are not limited only to Windows, DOS or UNIX systems, but can also be implemented in other operating systems.

It should also be noted that the disclosed innovative ideas are not limited only to systems using ISA, EISA, and/or PCI busses, but can also be implemented in systems using other bus architectures.

It should also be noted that the disclosed innovative ideas are not limited only to systems based on an x86-compatible microprocessor, but can also be implemented in systems using 680x0, RISC, or other processor architectures.

It should also be noted that the disclosed innovative ideas are not by any means limited to systems using a single-processor CPU, but can also be implemented in computers using multiprocessor architectures.

It should also be noted that the disclosed innovative ideas are not by any means limited to single-user desktop systems, but are also applicable to network servers, mainframe transaction processing systems, terminals, engineering workstations, portable computers, and other computing systems to which an external display and keyboard can be attached.

It should also be noted that use of the term "word" in this context also comprises text strings and single-syllable alphanumeric strings typically used in security password schemes.

What is claimed is:

1. A security method for controlling user access to a complex electronic system, comprising the actions of:
   (a.) when a user requests access, prompting the user with a customized challenge string which is specific to that user, and waiting for the user to input a user password;
   (b.) checking said user password for similarity to a pre-defined response string which includes more than 20 alphanumeric characters; and
   (c.) allowing access to said system if said user password is substantially similar to said pre-defined password, even if said user password is not identical to said pre-defined password.

2. The method of claim 1, wherein said challenge string and said response string are both stored in flash memory.

3. The method of claim 1, wherein said response string includes more than 40 alphanumeric characters.

4. The method of claim 1, wherein said prompting action consists of displaying characters on a video display.

5. The method of claim 1, wherein said actions (b.) and (c.) are repeated at least twice during each login, using a further customized challenge string and a further response string.

6. The method of claim 1, further comprising:
   d.) if said user password is not substantially similar to said pre-defined password, re-presenting said challenge phrase a predetermined number of times.

7. The method of claim 1, further comprising:
   d.) if said user password is not substantially similar to said pre-defined password, repeating action (b.) with a different challenge phrase.

8. The method of claim 1, wherein said challenge phrase is randomly chosen from a pool of possible challenge phrases for that specific user.

9. A security method for controlling user access to a computer system, comprising the actions of:
   (a.) when said system is powered up, automatically executing a start-up procedure stored in a non-volatile memory;
   (b.) during execution of said start-up procedure, prompting a user with a customized challenge phrase which is specific to that user, and waiting for the user to input a user password;
   (c.) checking said user password for similarity to a pre-defined password which includes more than 20 alphanumeric characters; and (d.) allowing access to said system if said user password is substantially similar to said pre-defined password, even if said user password is not identical to said pre-defined password.

10. The method of claim 9, wherein said challenge string and said pre-defined password are both stored in flash memory.

11. The method of claim 9, wherein said pre-defined password includes more than 40 alphanumeric characters.

12. The method of claim 9, wherein said prompting action consists of displaying characters on a video display.

13. The method of claim 9, wherein said actions (b.), (c.), and (d.) are repeated at least twice during each login.

14. The method of claim 9, further comprising:
   d.) if said user password is not substantially similar to said pre-defined password, re-presenting said challenge phrase a predetermined number of times.

15. The method of claim 9, further comprising:
   d.) if said user password is not substantially similar to said pre-defined password, repeating action (b.) with a different challenge phrase.

16. The method of claim 9, wherein said challenge phrase is randomly chosen from a pool of possible challenge phrases for that specific user.

17. A method for starting up a computer system, comprising the actions of:
   (a.) when said system is powered up, automatically executing a start-up procedure stored in a non-volatile memory;
   (b.) during execution of said start-up procedure, waiting for a user identification, and accordingly displaying a customized challenge phrase, which is specific to that user, on a video display with and waiting for the user to input a user password;
   (c.) checking said user password for similarity to a pre-defined password which includes more than 30 alphanumeric characters;
   (d.) continuing the start-up procedure if said user password is substantially similar to said pre-defined password, even if said user password is not identical to said pre-defined password; and
   (e.) otherwise halting the start-up procedure.

18. The method of claim 17, wherein said challenge string and said pre-defined password are both stored in flash memory.

19. The method of claim 17, wherein said pre-defined password includes more than 40 alphanumeric characters.

20. The method of claim 17, wherein said prompting action consists of displaying characters on a video display.

21. The method of claim 17, wherein said actions (b.), (c.), and (d.) are repeated at least twice during each login.

22. The method of claim 17, further comprising:
   d.) if said user password is not substantially similar to said pre-defined password, re-presenting said challenge phrase a predetermined number of times.

23. The method of claim 17, further comprising:
   d.) if said user password is not substantially similar to said pre-defined password, repeating action (b.) with a different challenge phrase.

24. The method of claim 17, wherein said challenge phrase is randomly chosen from a pool of possible challenge phrases for that specific user.

25. A computer system, comprising:
   memory, and a microprocessor operatively connected to read and write said memory;
   one or more non-volatile memories storing a start-up procedure, at least one stored user-specific challenge string, and at least one stored user-specific response string which includes more than 20 alphanumeric characters;
   wherein, when a user attempts to log in, said start-up procedure presents said challenge string, and checks a user response string against said stored response string, and permits access to the computer if the user response substantially matches said stored response string, even if the user response is not identical to said stored response string; and
   a graphics controller connected to said microprocessor; and
   a video display connected to said graphics controller.

26. The computer system of claim 25, wherein said challenge string and said stored response string are both stored in flash memory.

27. The computer system of claim 25, wherein said stored response string includes more than 40 alphanumeric characters.

28. The computer system of claim 25, wherein said challenge string is presented on a video display.

29. The computer system of claim 25, further comprising the step:
   if said user password is not substantially similar to said pre-defined password, re-presenting said challenge phrase a predetermined number of times.

30. The computer system of claim 25, further comprising the step:
   if said user password is not substantially similar to said pre-defined password, said start-up procedure presents a different challenge string, checks a second user response string against said stored response string, and permits access to the computer if said second user response string substantially matches said stored response string even if said second user response string is not identical to said stored response string.

31. The computer system of claim 25, wherein said challenge phrase is randomly chosen from a pool of possible challenge phrases for that specific user.

32. The computer system of claim 25, wherein said start-up procedure presents at least two different challenge phrases during said start-up procedure.

33. A computer system, comprising:
   memory, and a microprocessor operatively connected to read and write said memory;
   a graphics controller connected to said microprocessor;
   a video display connected to said graphics controller;
   a user input device connected to said microprocessor;
   wherein, when a user requests access, said microprocessor
      prompts the user with a customized challenge string which is specific to that user,
      waits for the user to input a user password,
      checks said user password for similarity to a pre-defined response string which includes more than 20 alphanumeric characters, and
      allows access to said system if said user password is substantially similar to said pre-defined response string, even if said user password is not identical to said pre-defined response string.

34. The computer system of claim 33, wherein said challenge string and said response string are both stored in flash memory.

35. The computer system of claim 33, wherein said response string includes more than 40 alphanumeric characters.

36. The computer system of claim 33, wherein said challenge string is presented on a video display.

37. The computer system of claim 33, further comprising the step:
if said user password is not substantially similar to said pre-defined password, re-presenting said challenge phrase a predetermined number of times.

38. The computer system of claim 33, further comprising the step:
if said user password is not substantially similar to said pre-defined password, repeating said steps of prompting, waiting, and checking with a different challenge phrase.

39. The computer system of claim 33, wherein said challenge phrase is randomly chosen from a pool of possible challenge phrases for that specific user.

40. The computer system of claim 33, wherein said start-up procedure presents at least two different challenge phrases before allowing access to said system.

41. A computer system, comprising:
memory, and a microprocessor operatively connected to read and write said memory;
a graphics controller connected to said microprocessor;
a video display connected to said graphics controller;
one or more non-volatile memories storing a start-up procedure, at least one stored user-specific challenge string, and at least one stored user-specific response string which includes more than 20 alphanumeric characters;
wherein, when a user submits identification, said microprocessor
displays a customized challenge string, which is specific to that user, on said video display,
waits for the user to input a user password,
checks said user password for similarity to a pre-defined response string which includes more than 20 alphanumeric characters, and
continues said start-up procedure if said user password is substantially similar to said pre-defined password, even if said user password is not identical to said pre-defined password, and otherwise halts the start-up procedure.

42. The computer system of claim 41, wherein said challenge string and said response string are both stored in flash memory.

43. The computer system of claim 41, wherein said response string includes more than 40 alphanumeric characters.

44. The computer system of claim 41, wherein said challenge string is presented on a video display.

45. The computer system of claim 41, further comprising the step:
if said user password is not substantially similar to said pre-defined password, re-presenting said challenge phrase a predetermined number of times.

46. The computer system of claim 41, further comprising the step:
if said user password is not substantially similar to said pre-defined password, repeating said displays step with a different challenge phrase.

47. The computer system of claim 41, wherein said challenge phrase is randomly chosen from a pool of possible challenge phrases for that specific user.

48. The computer system of claim 41, wherein said start-up procedure at least two different challenge phrases before continuing said start-up procedure.

* * * * *